United States Patent
Kim et al.

(10) Patent No.: US 9,276,681 B2
(45) Date of Patent: Mar. 1, 2016

(54) METHOD AND APPARATUS FOR TRANSFORMING DATA SYMBOL FOR INTERFERENCE AVOIDANCE

(71) Applicants: LG ELECTRONICS INC., Seoul (KR); POSTECH ACADEMY-INDUSTRY FOUNDATION, Gyeongsangbuk-do (KR)

(72) Inventors: Ki Jun Kim, Seoul (KR); Joon Ho Cho, Gyeongsangbuk-do (KR); Yeo Hun Yun, Gyeongsangbuk-do (KR); Min Uk Kim, Gyeongsangbuk-do (KR); Ju Bum Kim, Gyeongsangbuk-do (KR)

(73) Assignees: LG ELECTRONICS INC., Seoul (KR); POSTECH ACADEMY-INDUSTRY FOUNDATION, Gyeongsangbuk-Do (KR)

( * ) Notice: Subject to any disclaimer, the term of this patent is extended or adjusted under 35 U.S.C. 154(b) by 120 days.

(21) Appl. No.: 14/259,989

(22) Filed: Apr. 23, 2014

(65) Prior Publication Data

US 2015/0043443 A1 Feb. 12, 2015

Related U.S. Application Data

(60) Provisional application No. 61/863,390, filed on Aug. 7, 2013.

(51) Int. Cl.
*H04B 15/00* (2006.01)
*H04B 7/04* (2006.01)
*H04L 25/03* (2006.01)

(52) U.S. Cl.
CPC .............. *H04B 15/00* (2013.01); *H04B 7/0413* (2013.01); *H04L 25/03343* (2013.01)

(58) Field of Classification Search
None
See application file for complete search history.

(56) References Cited

U.S. PATENT DOCUMENTS

| | | | | |
|---|---|---|---|---|
| 8,295,383 | B2 * | 10/2012 | Yoshida | H04B 1/71052 375/267 |
| 8,570,918 | B2 * | 10/2013 | Wang | H04L 25/03159 370/295 |
| 2012/0170516 | A1 * | 7/2012 | Noh | H04B 7/0639 370/328 |

* cited by examiner

*Primary Examiner* — Hong Cho
(74) *Attorney, Agent, or Firm* — Lee, Hong, Degerman, Kang & Waimey

(57) ABSTRACT

Disclosed are a method and an apparatus for transforming a data symbol for interference avoidance. The method for transforming a data symbol includes; dividing a plurality of proper data symbols into a plurality of data streams; granting individual spectral weightings to the plurality of respective data streams; combining the plurality of data streams granted with the individual spectral weightings into one final data stream; performing inverse discrete Fourier transform (IDFT) of the final data stream; and adding a cyclic prefix (CP) to the plurality of data streams that is subjected to the IDFT, wherein each of the plurality of data streams granted with the individual spectral weightings include an improper data symbol.

8 Claims, 10 Drawing Sheets

METHOD AND APPARATUS FOR TRANSFORMING DATA SYMBOL FOR INTERFERENCE AVOIDANCE

CROSS-REFERENCE TO RELATED APPLICATIONS

This application claims the benefit of priority of U.S. Provisional application 61/863,390 filed on Aug. 7, 2013 which are incorporated by reference in their entirety herein.

BACKGROUND OF THE INVENTION

1. Field of the Invention

The present invention relates to wireless communication, and more particularly, to a method and an apparatus for generating signals transmitted and received in a cellular network.

2. Related Art

In recent years, a service requiring ultra-high wireless communication such as wireless Internet has increased rapidly. As a result, a research into a communication technique that can ensure the ultra-high wireless communication for a next-generation wireless communication system has been actively progressed. Therefore, a lot of researches for a plurality of users to efficiently use resources including time, a frequency, a space, and the like for communication have been progressed. However, when more users are present than given resources, a high channel capacity for the ultra-high speed communication cannot be acquired due to interuser interference by the existing frequency division access, time-division access, and a code division access techniques, and the like.

Accordingly, in recent years, interference alignment (IA) technology in which a desired signal and undesired interference are divisionally transmitted to different spaces is proposed to turn over theoretical development on a transmission/reception technique in order to solve the problem that the high channel capacity cannot be acquired due to the interuser interference. It is certified that such a technique prevents performance deterioration by interference without complicated error correction encoding under a multi-user environment of a general interference channel and acquires a degree-of-freedom by maximizing the use of the given resources to thereby acquire the high channel capacity.

In detail, it is revealed that the interference alignment technique can almost achieve a channel capacity of an interference channel under a situation in which a signal-to-noise ratio is very high. The interference alignment technique is extended to the cellular network as well as the interference channel to be researched. It is revealed that in the cellular network constituted by two cells, users positioned in other cell may receive interference signals applied to a base station of a current cell to be arranged, and as a result, a lot of signal spaces for users for the current cell can be ensured. For example, when respective users transmit one stream, the users may allow an interference signal applied to the base station of other cell to be aligned and received in one-dimension signal space.

SUMMARY OF THE INVENTION

An object of the present invention is to provide a method for transforming a data symbol for interference avoidance.

Another object of the present invention is to provide an apparatus for transforming a data symbol for interference avoidance.

In accordance with an embodiment of the present invention, a method for transforming a data symbol includes: dividing a plurality of proper data symbols into a plurality of data streams; granting individual spectral weightings to the plurality of respective data streams; combining the plurality of data streams granted with the individual spectral weightings into one final data stream; performing inverse discrete Fourier transform (IDFT) of the final data stream; and adding a cyclic prefix (CP) to the plurality of data streams that is subjected to the IDFT, wherein each of the plurality of data streams granted with the individual spectral weightings include an improper data symbol.

In accordance with another embodiment of the present invention, a terminal for transforming a data symbol includes: a radio frequency (RF) unit implemented to transmit or receive a radio signal; and a processor selectively connected to the RF unit, wherein the processor is implemented to divide a plurality of proper data symbols into a plurality of data streams, grant individual spectral weightings to the plurality of respective data streams, combine the plurality of data streams granted with the individual spectral weightings into one final data stream, perform inverse discrete Fourier transform (IDFT) of the final data stream, and add a cyclic prefix (CP) to the plurality of data streams that is subjected to the IDFT, and each of the plurality of data streams granted with the individual spectral weightings include an improper data symbol.

When the method and the apparatus for generating a signal for interference avoidance are used, an improper complex signal having desired 2D power spectral density (PSD) and 2D complementary power spectral density (PSD) on a transmitter based on a proper symbol input by using an orthogonal frequency division multiple access (OFDMA) transmitting apparatus and a code phase division multiple access (CP-DMA) transmitting apparatus. When a symbol having improperness is used, more improved performance may be acquired in a cellular network in which users are saturated than the existing method.

DESCRIPTION OF EXEMPLARY EMBODIMENTS

Figure 1:
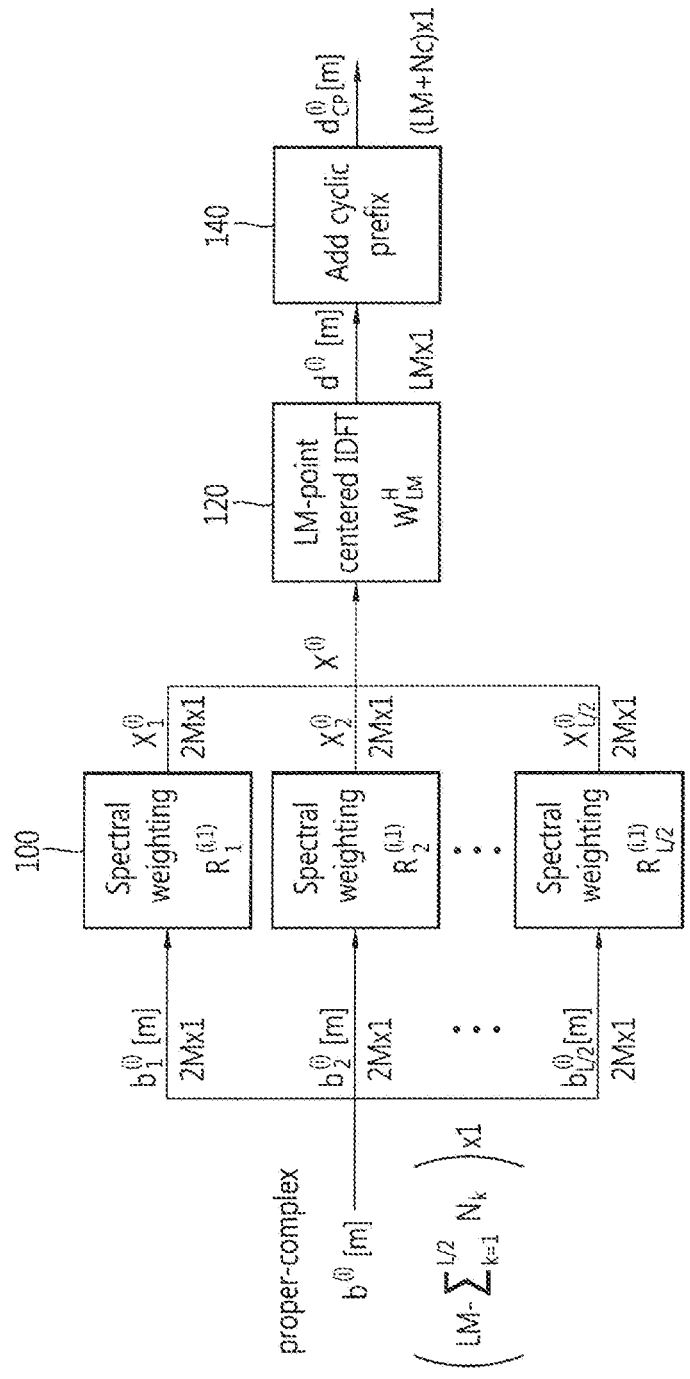
FIG. 1 is a conceptual diagram illustrating a method for transforming a proper data symbol to an improper data symbol.

A terminal (user equipment, UE) may be fixed or movable and may be called other terms such as a mobile station (MS), a mobile terminal (MT), a user terminal (UT), a subscriber station (SS), a wireless device, a personal digital assistant (PDA), a wireless modem, a handheld device, and the like.

The base station generally represents a fixed station that communicates with a terminal, and may be called different terms such as an evolved-NodeB (eNB), a base transceiver system (BTS), an access point, and the like.

In recent years, services and users requiring ultra-high wireless communication such as wireless Internet has increased rapidly. In particular, in a floating population center of a downtown area, more users than a capacity supported by a communication system exist, and as a result, it is difficult to satisfy individual quality of service. In order to satisfy a quality of service requested by a plurality of terminals, interference alignment technology is researched.

In the case of the existing interference alignment technology, only an interference channel is considered and a direct channel is not considered. The direct channel indicates a channel through which the terminal (or mobile station (MS) transmits a signal to a base station (or base station) to which the terminal belongs in the case of an uplink and indicates a channel through which the base station (BS) transmits a signal to the mobile station (MS) included in the BS in the case of a downlink. Since a main purpose of an interference network interference alignment is an alignment of interference as well as a cellular network interference alignment, only the interference channel is considered and the direct channel is not considered, in general. However, the interference alignment method may not be optimal in an infinite (SNR) section but a finite SNR section. If the direct channel is to be considered in the interference alignment method, a gain may be increased at the time of receiving a desired signal in the terminal or the base station. Accordingly, in the interference alignment method, when the direct channel is considered, higher sum-rate may be achieved. When the direct channel is considered in the interference alignment method, global channel information may be required.

In recent years, in a lot of interference alignment methods, a specific node having the global channel information is present and the specific node generally notifies a transmission method for interference alignment to each terminal or terminal. However, it may be difficult for the specific node to know the global channel information.

Distributed interference alignment (IA) is a representative algorithm to solve an interference alignment problem in the existing interference channel. A distributed interference alignment method in the interference channel representatively includes a signal to interference-plus-noise ratio (Max-SINR) algorithm, and a minimum mean square error (MMSE)-IA, and a plurality of iterative algorithms similar thereto. The distributed interference alignment method may be performed based on reciprocity of a channel. The channel reciprocity may be generally established in an environment using time-division duplexing (TDD).

When the channel reciprocity is established, a direction of a received beam set for minimum interference in a receiver becomes a direction in which minimum interference is applied to other transmitters at the time when the receiver performs transmission contrary to this.

However, in a network in a saturated state, it is difficult to separate the desired signal and the undesired interference signal due to shortage of a signal space due to a plurality of terminals. Accordingly, satisfactory performance may not be achieved by only the existing Max-SINR and the existing MMSE-IA algorithm. Accordingly, in the embodiment of the present invention, a method is disclosed, which arbitrarily ensures the signal space capable of using the distributed IA when the signal space is short in a saturation state in the number of users in a cell.

A probability variable (alternatively, random variable) in which a reciprocal autocorrelation coefficient is 0 may be proper or a proper probability variable. On the contrary, a probability variable in which the reciprocal autocorrelation coefficient is not 0 may be improper or an improper probability variable. In general, a symbol used for communication is a proper probability variable having a complex value. That is, the symbol used of the communication has power of a real number part and power of an imaginary number part and has a characteristic in which a mutual correlation coefficient is 0. However, in the cellular network in the saturated state, it is necessary to ensure the signal space in order to acquire desired interference alignment performance due to the shortage of the signal space. In order to solve the problem, it is necessary to ensure the signal space by using improperness of a transmission symbol.

That is, in the interference alignment method according to the embodiment of the present invention in order to ensure the performance of the interference alignment in a cellular network in which user numerical figures are saturated by considering the improper symbol, the signal space may be ensured by using more improved performance than the existing method.

FIG. 1 is a conceptual diagram illustrating a method for transforming a proper data symbol to an improper data symbol.

In FIG. 1, an OFDMA based transmission structure is illustrated.

Referring to FIG. 1, a process of transforming a proper data symbol $b^{(i)}[m]$ to a precoded data symbol vector $d^{(i)}[m]$ is illustrated. Herein, i represents a user index and m represents a block index. One block may mean information unit of data which the terminal or base station downlink-transmits or downlink-transmits.

The proper data symbol $b^{(i)}[m]$ may be expressed as represented by Equation 1 below.

$$b^{(i)}[m] = \begin{bmatrix} b_1^{(i)}[m] \\ b_2^{(i)}[m] \\ \vdots \\ b_{LM-\sum_{k=1}^{L/2} N_k}^{(i)}[m] \end{bmatrix} \quad \langle \text{Equation 1} \rangle$$

Herein, LM represents a block length and $N_c$ a cyclic prefix length.

The proper data symbol $b^{(i)}[m]$ may include L/2 division data symbol streams $$b_1^{(i)}[m], b_2^{(i)}[m], b_{LM-\sum_{k=1}^{L/2} N_k}^{(i)}[m]$$

having a length of 2M. The respective division data symbol streams are expressed as illustrated in Equation 2 below.

$$b^{(i)}[m] \triangleq \begin{bmatrix} [b_1^{(i)}[m]]_{\sum_{l=1}^{k-1}(2M-N_l)+1} \\ [b_2^{(i)}[m]]_{\sum_{l=1}^{k-1}(2M-N_l)+1} \\ \vdots \\ [b_2^{(i)}[m]]_{\sum_{l=1}^{k-1}(2M-N_l)+1} \\ 0 \\ \vdots \\ 0 \end{bmatrix},$$  <Equation 2>

$$k \in \left\{1, 2, \ldots, \frac{L}{2}\right\}$$

The number of 0 fed in the respective division data symbol stream $b_k^{(i)}[m]$ is $N_k$. A method for determining $N_k$ will be described below in detail.

Spectral weightings $R_k^{(i)}$ may be granted in the respective division data symbol streams (100).

The respective division streams granted with $R_k^{(i)}$ may be determined as $X_k^{(i)}$.

$X_k^{(i)}$ as 2M×1 may be defined as illustrated in Equation 3 below.

$$X_k^{(i)} \triangleq \begin{bmatrix} X_{\frac{L}{2}+k}^{(i)} \\ X_{\frac{3L}{2}+k}^{(i)} \\ \vdots \\ X_{\frac{(2M-1)L}{2}+k}^{(i)} \\ X_{\frac{(2M-1)L}{2}+k}^{(i)*} \\ X_{\frac{(2M-3)L}{2}+k}^{(i)*} \\ \vdots \\ X_{\frac{L}{2}+k}^{(i)*} \end{bmatrix}$$  <Equation 3>

Where, $$k \in \left\{1, 2, \ldots, \frac{L}{2}\right\}.$$

Figure 2:
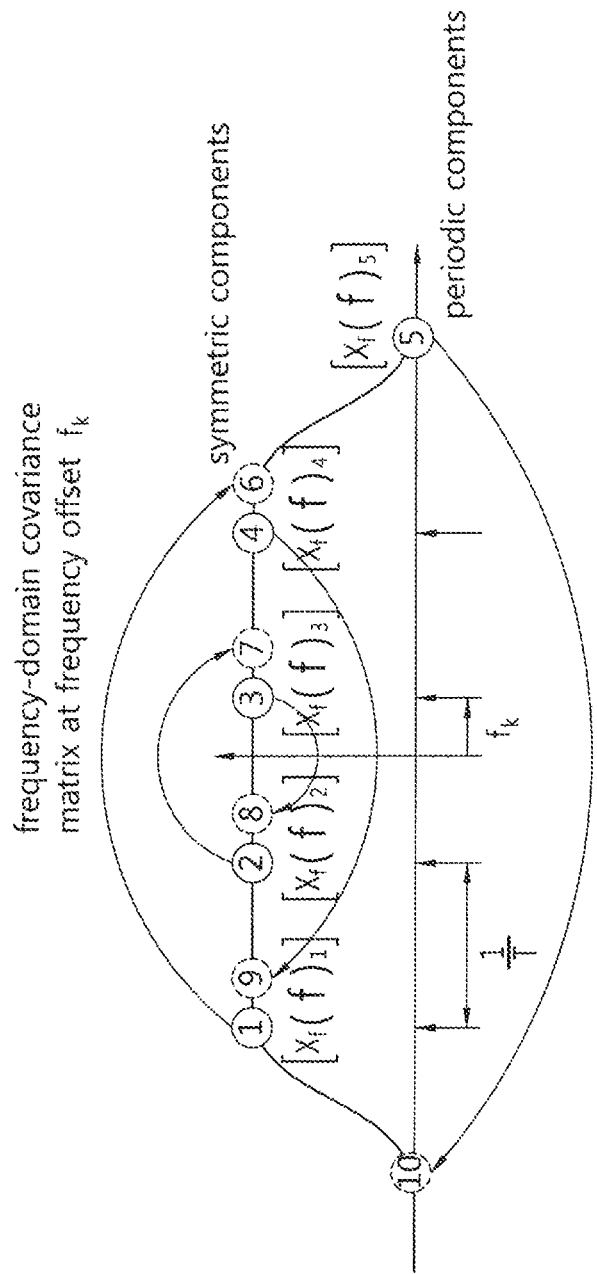
FIG. 2 illustrates symmetric components and a period component of an improper complex signal according to an embodiment of the present invention.

The reason for defining $X_k^{(i)}$ as illustrated in Equation 3 is that since a signal $X^{(i)}$ to be generated is a complex number, only a periodic part and only a symmetric part are correlated to each other as illustrated in FIG. 2.

FIG. 2 illustrates symmetric components and a periodic component of an improper complex signal according to an embodiment of the present invention.

Therefore, when a covariance matrix of $X_k^{(i)}$ is represented by $R_k^{(i)}$, $X_k^{(i)}$ may be determined to satisfy Equation 4 below.

$$E\left\{X_k^{(i)} X_k^{(i)H}\right\} = \begin{bmatrix} R^{(i)}(f_k) & \tilde{R}^{(i)}(f_k) \\ \tilde{R}^{(i)}(f_k)^H & R^{(i)}(-f_k)^* \end{bmatrix} = R_k^{(i)},$$  <Equation 4>

-continued $$k \in \left\{1, 2, \ldots, \frac{L}{2}\right\}$$

Where, $R^{(i)}(f_k)$ and $\tilde{R}^{(i)}(f_k)$ are matrices having a size of M×M and, and may be determined as a 2 dimensional (2D) power spectral density (PSD) and a 2D complementary PSD, respectively, and represent spectral correlations at a frequency position fk.

In Equation 4, $R_k^{(i)}$ represents a Hermitian matrix having a size of 2M×2M. Now, herein, when $N_k$ is defined, $N_k$ is described as illustrated in Equation 5 below. $N_k$ may represent the number of 0 fed in the respective division data symbol streams $b_k^{(i)}[m]$.

$$N_k \triangleq 2M - \text{Rank}(R_k^{(i)})$$  <Equation 5>

Now, $X_k^{(i)}$ may be acquired through a calculation of Equation 6.

$$X_k^{(i)} = U_k^{(i)} \Lambda_k^{(i)\frac{1}{2}} b_k^{(i)}[m]$$  <Equation 6>

$U_k^{(i)}$, $\Lambda_k^{(i)}$ of Equation 6 is a matrix acquired when $R_k^{(i)}$ is subjected to eigenvalue decomposition as illustrated in Equation 7 below. It is assumed that $\Lambda_k^{(i)}$ is a diagonal matrix arranged in a descending order. That is, last $N_k$ diagonal entries is determined as 0.

$$R_k^{(i)} = U_k^{(i)} \Lambda_k^{(i)} U_k^{(i)H}$$  <Equation 7>

$X_k^{(i)}$ may be determined based on Equation 6 and $X^{(i)}$ may be determined through a relationship of Equation 3.

The generated may be generated by $d^{(i)}[m]$ which is an LM×1 matrix based on inverse discrete Fourier transform $W_{LM}^H$ 120 at the center of an LM point. $d^{(i)}[m]$ which is the LM×1 matrix is added with a CP 140 to be generated as $d_{CP}^{(i)}[m]$.

Hereinafter, in the embodiment of the present invention, when L=2, M=2 and $$R_1^{(i)} = \begin{bmatrix} I_2 & 0.5I_2 \\ 0.5I_2 & I_2 \end{bmatrix}$$

are given, a method for generating an improper signal will be disclosed. In this case, $N_1=0$ is acquired by Equation 5.

First, $X_k^{(i)}$ may be defined as illustrated in Equation 8 below.

$$X_1^{(i)} \triangleq \begin{bmatrix} X_2 \\ X_4 \\ X_3^* \\ X_1^* \end{bmatrix}$$  <Equation 8>

When eigenvalue decomposition of $R_1^{(i)}$ is performed based on Equation 7, $U_k^{(i)}$, $\Lambda_k^{(i)}$ may be determined. When $U_k^{(i)}$, $\Lambda_k^{(i)}$ is determined, $$U_k^{(i)}, \Lambda_k^{(i)\frac{1}{2}}$$

may be calculated in order to determine $X_k^{(i)}$ as illustrated in Equation 9 below.

$$U_k^{(i)} \Lambda_k^{(i)\frac{1}{2}} = \begin{bmatrix} -0.5 & 0 & 0 & -0.866 \\ 0 & 0.5 & 0.866 & 0 \\ 0.5 & 0 & 0 & -0.866 \\ 0 & -0.5 & 0.866 & 0 \end{bmatrix} \quad \text{⟨Equation 9⟩}$$

When $X_k^{(i)}$ is acquired by using Equation 6 based on $$U_k^{(i)} \Lambda_k^{(i)\frac{1}{2}},$$

$X_k^{(i)}$ may be expressed as illustrated in Equation 10 below.

$$X_1^{(i)} = \begin{bmatrix} -0.5 & 0 & 0 & -0.866 \\ 0 & 0.5 & 0.866 & 0 \\ 0.5 & 0 & 0 & -0.866 \\ 0 & -0.5 & 0.866 & 0 \end{bmatrix} \begin{bmatrix} b_1^{(i)}[m] \\ b_2^{(i)}[m] \\ b_3^{(i)}[m] \\ b_4^{(i)}[m] \end{bmatrix} \quad \text{⟨Equation 10⟩}$$

$$X^{(i)} = \begin{bmatrix} X_1 \\ X_2 \\ X_3 \\ X_4 \end{bmatrix}$$

may be determined with $$X_1^{(i)} = \begin{bmatrix} X_2 \\ X_4 \\ X_3^* \\ X_1^* \end{bmatrix}$$

acquired as above.

Figure 3:
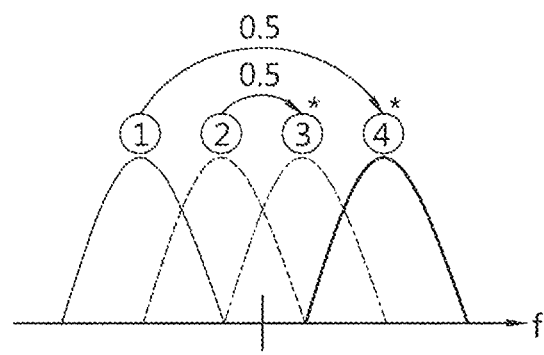
FIG. 3 is a conceptual diagram illustrating a generated improper signal according to the embodiment of the present invention.

FIG. 3 is a conceptual diagram illustrating a generated improper signal according to the embodiment of the present invention.

Referring to FIG. 3, in the case of the spectral correlation of the signal generated through the aforementioned method, an improper complex signal having only the symmetric correlation may be generated.

Hereinafter, in the embodiment of the present invention, a method for generating an improper signal based on CPDMA will be disclosed.

Figure 4:
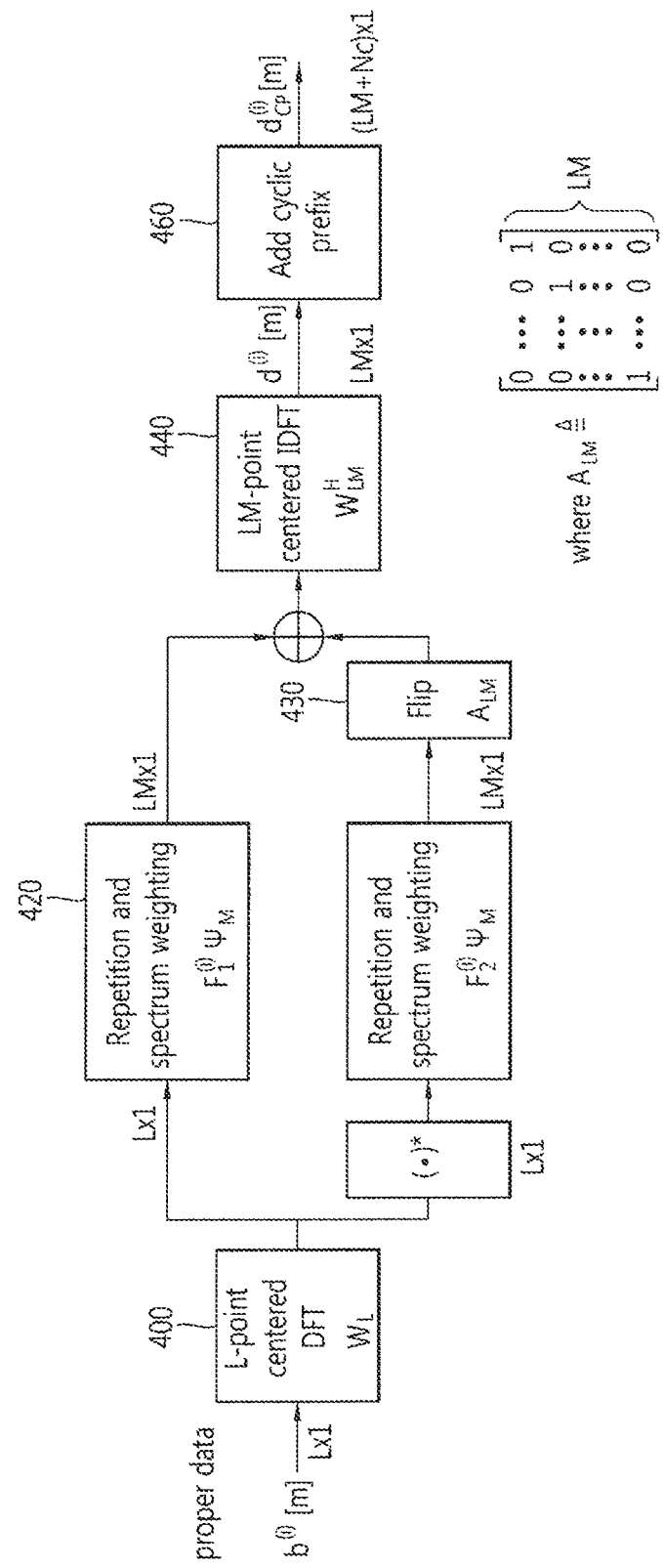
FIG. 4 is a conceptual diagram illustrating a method for generating an improper signal based on CPDMA presented by the present invention.

FIG. 4 is a conceptual diagram illustrating a method for generating an improper signal based on CPDMA presented by the present invention.

Referring to FIG. 4, a method for generating $d_{CP}^{(i)}[m]$ which is an improper signal based on $b^{(i)}[m]$ which is a proper signal is illustrated.

Each of DFT $W_L$ 400 at the center of an L point of $b^{(i)}[m]$ which is the proper signal may be performed. A result of performing the DFT 400 and a result of performing complex conjugation of the result is repeatedly performed and is grated with a spectral weighting $F_{1(i)}\Psi_M$, $F_2^{(i)}\Psi_M$ 420 to generate the LM×1 matrix. The result of performing the complex conjugation may be additionally subjected to flip $A_{LM}$ 430.

Two results are added to generate $X^{(i)}$. The generated $X^{(i)}$ may be expressed as illustrated in Equation 11.

$$X^{(i)} = F_1^{(i)}\Psi_M W_L b^{(i)} + A_{LM} F_2^{(i)} \Psi_M W_L b^{(i)*} \quad \text{⟨Equation 11⟩}$$

In Equation 11, $$b^{(i)}[m] \triangleq \begin{bmatrix} b_0^{(i)}[m] \\ b_1^{(i)}[m] \\ \vdots \\ b_{L-1}^{(i)}[m] \end{bmatrix}, \quad \Psi_M \triangleq \begin{bmatrix} I_L \\ I_L \\ \vdots \\ I_L \end{bmatrix}, \quad d^{(i)}[m] \triangleq \begin{bmatrix} d_0^{(i)}[m] \\ d_1^{(i)}[m] \\ \vdots \\ d_{LM-1}^{(i)}[m] \end{bmatrix}.$$

The determined $X^{(i)}$ may be generated as $d^{(i)}[m]$ by applying IDFT $W_{LM}^H$ 440 at the center of the LM point. $d_{CP}^{(i)}[m]$ may be generated by adding a cyclic shift 460 to $d^{(i)}[m]$ FIG. 5 is a conceptual diagram illustrating a correlation of the improper signal according to the embodiment of the present invention.

Figure 5:
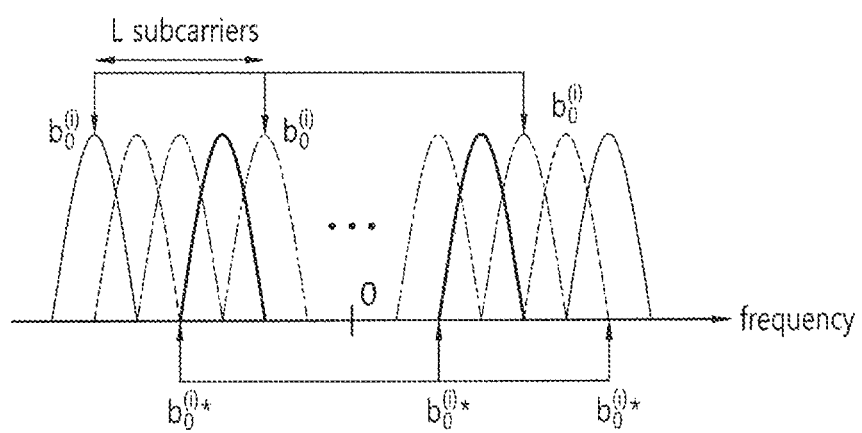
FIG. 5 is a conceptual diagram illustrating a correlation of the improper signal according to the embodiment of the present invention.

In FIG. 5, the correlation of the improper signal generated based on the CPDMA is illustrated like FIG. 4.

Referring to FIG. 5, in the case of the improper signal, a signal that performs the complex conjugate with a periodic correlation every L subcarrier may also have the correlation. The signal generated by such a method may be subjected to rank-2 signal transmission in terms of a real number.

Figure 6:
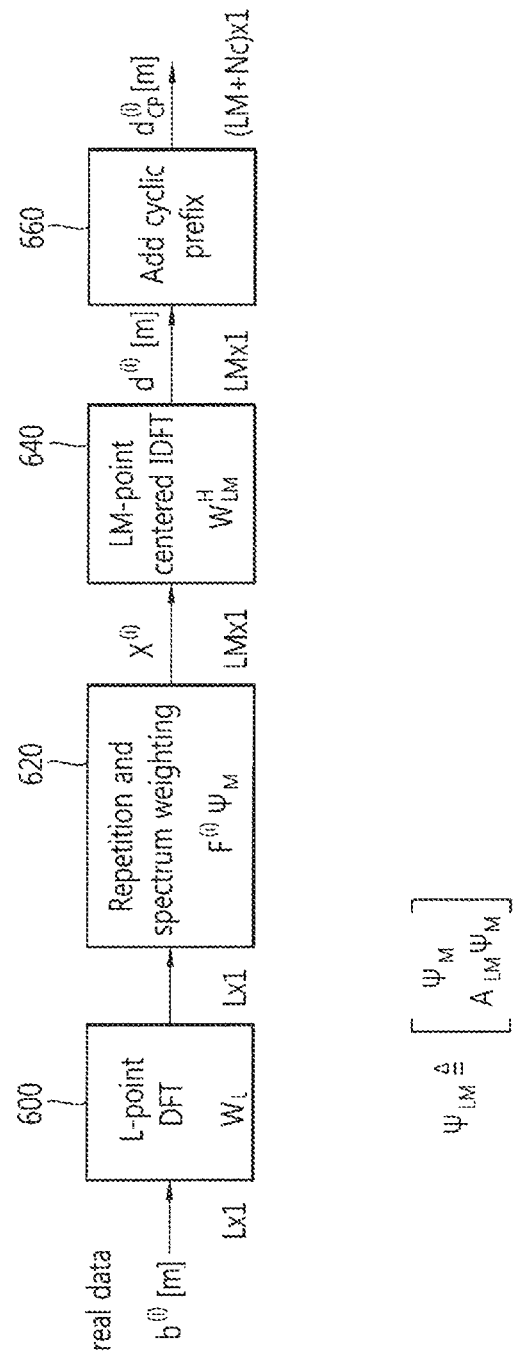
FIG. 6 is a conceptual diagram illustrating a method for generating an improper signal based on CPDMA presented by the present invention.

FIG. 6 is a conceptual diagram illustrating a method for generating an improper signal based on CPDMA according to an embodiment of the present invention.

In FIG. 6, a method that generates $d_{CP}^{(i)}[m]$ which is the improper signal based on $b^{(i)}[m]$ of the real number is illustrated.

$b^{(i)}[m]$ which is a proper signal may perform DFT $W_L$ 600 at the center of the L-point. A result of performing the DFT $W_L$ 600 at the center of the L-point with respect to $b^{(i)}[m]$ which is the proper signal and repetition and spectral weighting $F^{(i)}\Psi_M$ 620 is granted to the result to generate $X^{(i)}$ which is the LM×1 matrix.

The generated $X^{(i)}$ may be expressed as illustrated in Equation 11.

$$X^{(i)} = F^{(i)}\Psi_m W_L b^{(i)} \quad \text{⟨Equation 12⟩}$$

$$\Psi_m \triangleq \begin{bmatrix} \Psi_M \\ A_{LM}\Psi_M \end{bmatrix}$$

The determined $X^{(i)}$ may be generated as $W_{LM}^H$ by applying IDFT $d^{(i)}[m]$ 640 at the center of the LM point. $d_{CP}^{(i)[m]}$ may be generated by adding a cyclic shift 660 to $d^{(i)}[m]$.

Figure 7:
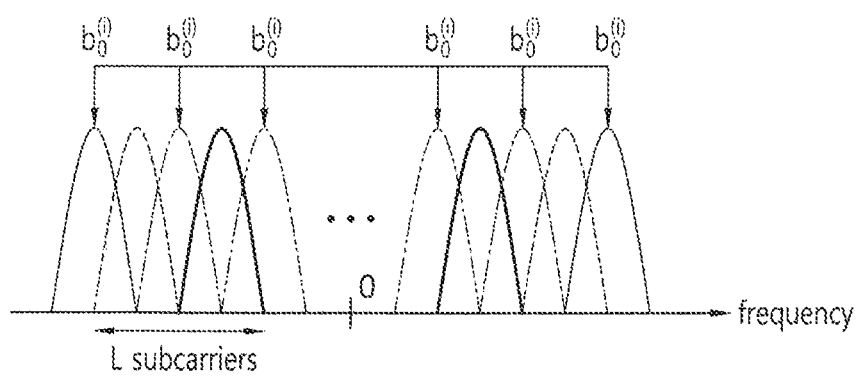
FIG. 7 is a conceptual diagram illustrating the correlation of the improper signal according to the embodiment of the present invention.

FIG. 7 is a conceptual diagram illustrating the correlation of the improper signal according to the embodiment of the present invention.

In FIG. 7, the correlation of the improper signal generated based on the CPDMA is illustrated like FIG. 5.

Referring to FIG. 7, a periodic correlation is generated every L subcarrier and the correlation is generated even in a symmetric part. The signal generated by such a method may be subjected to rank-1 signal transmission in terms of the real number.

Various other methods may be used to generate the improper signal as well as such a method.

Figure 8:
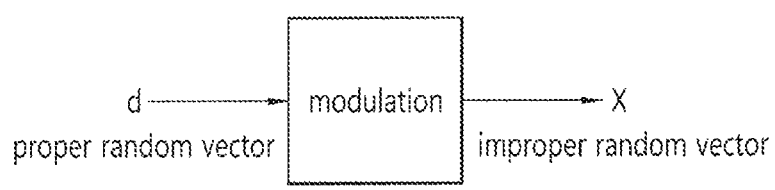
FIG. 8 is a conceptual diagram illustrating a method for transforming a signal according to an embodiment of the present invention.

FIG. 8 is a conceptual diagram illustrating a method for transforming a signal according to an embodiment of the present invention.

Referring to FIG. 8, the method for transforming a signal according to the embodiment of the present invention may perform transformation by using improperness of a signal to be generated.

$R_X$ and $\tilde{R}_X$ may represent an autocorrelation matrix and a complementary autocorrelation matrix of a random vector X, respectively. $\tilde{R}_X$ may be decomposed as illustrated in Equation 13 below by a Takagi decomposition.

$$\tilde{R}_X = R_X^{1/2} F K F^\tau R_X^{T/2} \qquad \text{<Equation 13>}$$

In Equation 13, F represents a unitary matrix and K represents a diagonal matrix in which a diagonal component has a value between 0 and 1. Herein, $k_l$ may represent a first diagonal component of K and $N_k$ may represent an improper constant defined as the number in which $k_l$ is 1.

When such a definition is used, an autocorrelation matrix of $[X^\tau, X^H]^\tau$ may be acquired as illustrated in Equation 14 below.

$$R_X = E\left\{\begin{bmatrix} X \\ X^* \end{bmatrix}\begin{bmatrix} X \\ X^* \end{bmatrix}^H\right\} \qquad \text{<Equation 14>}$$

$$= \begin{bmatrix} R_X & \tilde{R}_X \\ \tilde{R}_X^* & R_X^* \end{bmatrix}$$

$$= \begin{bmatrix} R_X^{1/2} F F^H R_X^{H/2} & R_X^{1/2} F K F^\tau R_X^{T/2} \\ R_X^{1/2*} F^* K F^H R_X^{H/2} & R_X^{1/2*} F^* F^\tau R_X^{T/2} \end{bmatrix}$$

$$= \begin{bmatrix} R_X^{1/2} & O_N \\ O_N & R_X^{1/2*} \end{bmatrix} \begin{bmatrix} F & O_N \\ O_N & F^* \end{bmatrix} \begin{bmatrix} I_N & K \\ K & I_N \end{bmatrix} \begin{bmatrix} F & O_N \\ O_N & F^* \end{bmatrix}^H$$

$$\begin{bmatrix} R_X^{1/2} & O_N \\ O_N & R_X^{1/2*} \end{bmatrix}^H$$

$$= \begin{bmatrix} R_X^{1/2} & O_N \\ O_N & R_X^{1/2*} \end{bmatrix} \begin{bmatrix} F & O_N \\ O_N & F^* \end{bmatrix} (2T_N)^H \begin{bmatrix} I_N + K & O_N \\ O_N & I_N - K \end{bmatrix}$$

$$T_N \begin{bmatrix} F & O_N \\ O_N & F^* \end{bmatrix} \begin{bmatrix} R_X^{1/2} & O_N \\ O_N & R_X^{1/2*} \end{bmatrix}^H$$

An autocorrelation matrix of $[d^\tau, d^H]^\tau$ is $I_{2N}$, with respect to a random vector d having properness. Therefore, when $$R_X^{1/2} = \begin{bmatrix} R_X^{1/2} & O_N \\ O_N & R_X^{1/2*} \end{bmatrix} \begin{bmatrix} F & O_N \\ O_N & F^* \end{bmatrix} (2T_N)^H \begin{bmatrix} (I_N + K)^{\frac{1}{2}} & O_N \\ O_N & (I_N - K)^{\frac{1}{2}} \end{bmatrix} T_N$$

is multiplied by $[d^\tau, d^H]^\tau$, $[X^\tau, X^H]^\tau$ having $\tilde{R}_X$ as the complementary autocorrelation matrix may be acquired.

Now, in order to decrease the length of the random vector d having required properness, the same $[X^\tau, X^H]^\tau$ may be acquired by using the case in which $K_l$ is 1. $k_l$ In the case in which $k_l$ is 1, a position in which the diagonal component is 0 is present in $I_N - K)^{1/2}$, and as a result, the same result may be acquired in spite of removing the component of the random vector d having properness, which is present at a position corresponding thereto.

When acquiring the same result is described by the equation, the random vector with the improperness, which has $R_X$ and $\tilde{R}_X$ as the autocorrelation matrix and the complementary autocorrelation matrix, respectively may be acquired from the random vector d as illustrated in Equation 15 below, by using the decomposition in Equation 13.

$$\begin{bmatrix} X \\ X^* \end{bmatrix} = \begin{bmatrix} R_X^{1/2} & O_N \\ O_N & R_X^{1/2*} \end{bmatrix} \begin{bmatrix} F & O_N \\ O_N & F^* \end{bmatrix} \qquad \text{<Equation 15>}$$

$$(2T_N)^H \begin{bmatrix} (I_N + K)^{\frac{1}{2}} & O_N \\ O_N & (I_N - K)^{\frac{1}{2}} \end{bmatrix} \begin{bmatrix} I_N & O_N \\ O_N & P \end{bmatrix} T_{N'} \begin{bmatrix} d \\ d^* \end{bmatrix}$$

As illustrated in Equation 15, when the random vector X and the complex conjugate thereof are acquired like a left side, only the random vector X may be extracted and used. In Equation 15, an N×N matrix T is a matrix defined in Equation 16 below.

$$T_N \triangleq \frac{1}{2} \begin{bmatrix} I_N & I_N \\ -jI_N & jI_N \end{bmatrix} \qquad \text{<Equation 16>}$$

The autocorrelation matrix of the complex random vector d is a unit matrix and the complementary autocorrelation matrix is 0. In Equation 15, a matrix P may be a unit matrix having a size of N and the length of the complex random vector d becomes N. Alternatively, the matrix P may be defined as a matrix in which a l-th column is deleted with respect to l in which $k_l$ corresponds to 1 in the unit matrix having the size of N, and in this case, the size of P becomes N-by-(N–$N_k$) and the length of the complex random vector d becomes $$N' \triangleq \left\lceil N - \frac{N_k}{2} \right\rceil$$

and means a minimum integer number which is not smaller than $$N - \frac{N_k}{2}.$$

Herein, when $N_k$ is an odd number, a column in which all components are 0 at predetermined positions is inserted into P to be newly defined and calculated to achieve matrix multiplication. For example, in the case of $N_k$=5, the length of the complex random vector becomes N'=N–2 and the length of $[d^\tau, d^H]^\tau$ becomes 2N'=2N–4. Therefore, since the matrix multiplication cannot be achieved in Equation 15, the column in which all components are 0 at predetermined positions is inserted into P in order to adjust an intermatrix size is inserted into P to be made into N-by-(N–4).

In the case of the transformation in Equation 15, the random vector X becomes the complex random vector having improperness and have $R_X$ and $\tilde{R}_X$ as the autocorrelation matrix and the complementary autocorrelation matrix, respectively.

Figure 9:
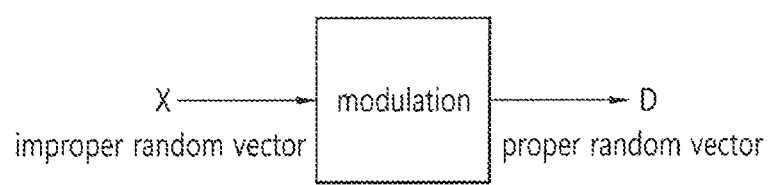
FIG. 9 is a conceptual diagram illustrating a method for transforming a signal according to an embodiment of the present invention.

FIG. 9 is a conceptual diagram illustrating a method for transforming a signal according to an embodiment of the present invention.

In FIG. 9, a method that acquires the random vector d having the properness from the random vector X transformed by using the improperness of the signal is disclosed contrary thereto.

Inverse transformation of Equation 15 may be acquired as illustrated in Equation 17 below.

$$\begin{bmatrix} d \\ d^* \end{bmatrix} = (2T_{N'})^H \begin{bmatrix} I_N & O \\ O & P^H \end{bmatrix} \begin{bmatrix} (I_N + K)^{-\frac{1}{2}} & O_N \\ O_N & (I_N - K)^{-\frac{1}{2}} \end{bmatrix}$$ ⟨Equation 17⟩

$$T_N \begin{bmatrix} F^H & O_N \\ O_N & F^H \end{bmatrix} \begin{bmatrix} R_X^{-1/2} & O_N \\ O_N & R_X^{-1/2*} \end{bmatrix} \begin{bmatrix} X \\ X^* \end{bmatrix}$$

Herein, a matrix $$(I_N - K)^{-\frac{1}{2}}$$

may be defined as a pseudo inverse matrix of a matrix $$(I_N - K)^{-\frac{1}{2}}.$$

That is, the matrix $$(I_N - K)^{-\frac{1}{2}}$$

may be a matrix in which components other than the diagonal component which has 0 has a reciprocal number and the component having 0 just has 0.

Hereinafter, in the embodiment of the present invention, a detailed example of the transformation method described in FIGS. 7 and 8 will be described.

It is assumed that the autocorrelation matrix and the complementary autocorrelation matrix of the random vector X to be calculated are given as $$R_X = \begin{bmatrix} 1 & 0 \\ 0 & 1 \end{bmatrix} = I_2$$

and $$\tilde{R}_X = \begin{bmatrix} 1 & 0 \\ 0 & 0.4 \end{bmatrix},$$

respectively. In this case, when the Takagi decomposition of Equation 13 is applied, $$K = \begin{bmatrix} 1 & 0 \\ 0 & 0.4 \end{bmatrix}$$

and $F=I_2$, and as a result, $k_1=1, k_2=0.4$. Accordingly, since there is one case of k=1, N'=2, $N_k$=1. In addition, $$P = \begin{bmatrix} 1 & 0 \\ 0 & 1 \end{bmatrix}$$

is determined. In this case, Equation 15 may be written as below.

$$\begin{bmatrix} X \\ X^* \end{bmatrix} = \begin{bmatrix} R_X^{1/2} & O_N \\ O_N & R_X^{1/2*} \end{bmatrix} \begin{bmatrix} F & O_N \\ O_N & F^* \end{bmatrix} (2T_N)^H \begin{bmatrix} I_N + K & O_N \\ O_N & I_N + K \end{bmatrix} \begin{bmatrix} I_N & O_N \\ O_N & P \end{bmatrix} T_{N'} \begin{bmatrix} d \\ d^* \end{bmatrix}$$ ⟨Equation 15⟩

$$= \begin{bmatrix} I_2 & O_2 \\ O_2 & I_2 \end{bmatrix} \begin{bmatrix} I_2 & O_2 \\ O_2 & I_2 \end{bmatrix} (2T_2)^H \begin{bmatrix} (I_2 + K)^{\frac{1}{2}} & O \\ O & (I_2 - K)^{\frac{1}{2}} \end{bmatrix} \begin{bmatrix} I_2 & O_2 \\ O_2 & P \end{bmatrix} T_{N'} \begin{bmatrix} d \\ d^* \end{bmatrix}$$

Now, when the equation is used by generating the proper random vector d that satisfies $d \neq CN(O_2, I_2)$ the improper random vector X which we desire is acquired. For example, in the case where the generated d is $$d = \begin{bmatrix} 0.3 + j0.5 \\ -0.2 + j0.9 \end{bmatrix},$$

when X is acquired by using the equation, $$X = \begin{bmatrix} 0.4243 \\ -0.2366 + j0.6971 \end{bmatrix}$$

is acquired. The random vector X acquired as above has $$R_X = \begin{bmatrix} 1 & 0 \\ 0 & 1 \end{bmatrix} = I_2$$

and $$\tilde{R}_X = \begin{bmatrix} 1 & 0 \\ 0 & 0.4 \end{bmatrix}$$

as the autocorrelation matrix and the complementary autocorrelation matrix, respectively.

Figure 10:
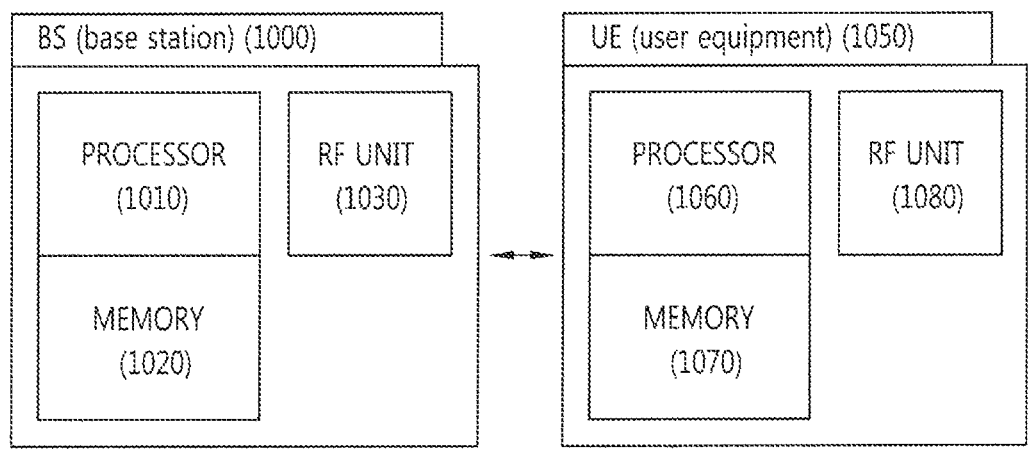
FIG. 10 is a block diagram illustrating a wireless communication system according to an embodiment of the present invention.

FIG. 10 is a block diagram illustrating a wireless communication system according to an embodiment of the present invention.

Referring to FIG. 10, a base station 1000 includes a processor 1010, a memory 1020, and a radio frequency (RF) unit 1030. The memory 1020 is connected with the processor 1010 to store various pieces of information for driving the processor 1010. The RF unit 1020 is connected with the processor 1010 to transmit and/or receive the radio signal. The processor 1010 implements a function, a process, and/or a method which are proposed. In the aforementioned embodiment, the operation of the base station may be implemented by the processor 1010.

Similarly, a UE 1050 includes a processor 1060, a memory 1070, and an RF unit 1080. The memory 1070 is connected with the processor 1060 to store various pieces of information for driving the processor 1060. The RF unit 1080 is connected with the processor 1060 to transmit and/or receive the radio signal. The processor 1060 implements a function, a process, and/or a method which are proposed. In the aforementioned embodiment, the operation of the terminal may be implemented by the processor 960.

For example, the processors 1010 and 1060 may perform the interference alignment based on an improper signal in a cellular network. The processors 1010 and 1060 may divide a plurality of proper data symbols to a plurality of data streams and grant individual spectral weightings to a plurality of respective data streams. The processors 1010 and 1060 may be implemented to combine the plurality of data streams granted with the individual spectral weightings into one final data stream, perform inverse Fourier transform (IDFT) of the final data stream, and add a cyclic prefix (CP) to the plurality of data streams which are subjected to the IDFT. The plurality of data streams granted with the individual spectral weightings may include the improper data symbol.

The processor may include an application-specific integrated circuit (ASIC), another chip set, a logic circuit and/or a data processing apparatus. The memory may include a read-only memory (ROM), a random access memory (RAM), a flash memory, a memory card, a storage medium, and/or another storage device. The RF unit may include a baseband circuit for processing the radio signal. When the embodiment is implemented by software, the aforementioned technique may be implemented by a module (a process, a function, and the like) that performs the aforementioned function. The module may be stored in the memory and executed by the processor. The memory may be present inside or outside the processor and may be connected with the processor through various well-known means.

In the aforementioned exemplary system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

What is claimed is:

1. A method for transforming a data symbol, the method comprising:
   dividing a plurality of proper data symbols into a plurality of data streams;
   granting individual spectral weightings to the plurality of respective data streams;
   combining the plurality of data streams granted with the individual spectral weightings into one final data stream;
   performing inverse discrete Fourier transform (IDFT) of the final data stream; and
   adding a cyclic prefix (CP) to the plurality of data streams that is subjected to the IDFT,
   wherein each of the plurality of data streams granted with the individual spectral weightings include an improper data symbol.

2. The method of claim 1, wherein:
   the plurality of data streams is determined as $$X_k^{(i)} = U_k^{(i)} \Lambda_k^{(i)\frac{1}{2}} b_k^{(i)}[m],$$

$U_k^{(i)}, \Lambda_k^{(i)}$ is acquired when $R_k^{(i)}$ is subjected to eigenvalue decomposition by $R_k^{(i)} = U_k^{(i)} \Lambda_k^{(i)} U_k^{(i)H}$,
$U_k^{(i)}$ is a unitary matrix,
$\Lambda_k^{(i)}$ is a diagonal matrix arranged in a descending order,
$b_k^{(i)}[m]$ represents each of the plurality of data streams, and
$R_k^{(i)}$ represents a covariance matrix of $X_k^{(i)}$.

3. The method of claim 2, wherein:
   $N_k$ represents the number of 0 fed in the plurality of respective data streams,
   $N_k$ is determined by $N_k \triangleq 2M - \text{Rank}(R_k^{(i)})$, and
   2M represents the length of each of the plurality of data streams.

4. The method of claim 2, wherein:
   $X_k^{(i)}$ is determined to satisfy $$E\{X_k^{(i)} X_k^{(i)H}\} = \begin{bmatrix} R^{(i)}(f_k) & \tilde{R}^{(i)}(f_k) \\ \tilde{R}^{(i)}(f_k)^H & R^{(i)}(-f_k)^* \end{bmatrix} = R_k^{(i)},$$

$$k \in \left\{1, 2, \ldots, \frac{L}{2}\right\}.$$

5. A terminal for transforming a data symbol, comprising:
   a radio frequency (RF) unit implemented to transmit or receive a radio signal; and
   a processor selectively connected to the RF unit,
   wherein the processor is implemented to
   divide a plurality of proper data symbols into a plurality of data streams;
   grant individual spectral weightings to the plurality of respective data streams;
   combine the plurality of data streams granted with the individual spectral weightings into one final data stream;
   perform inverse discrete Fourier transform (IDFT) of the final data stream; and
   add a cyclic prefix (CP) to the plurality of data streams that is subjected to the IDFT, and
   each of the plurality of data streams granted with the individual spectral weightings include an improper data symbol.

6. The terminal of claim 5, wherein:
   the plurality of data streams is determined as $$X_k^{(i)} = U_k^{(i)} \Lambda_k^{(i)\frac{1}{2}} b_k^{(i)}[m],$$

$U_k^{(i)}, \Lambda_k^{(i)}$ is acquired when $R_k^{(i)}$ is subjected to eigenvalue decomposition by $R_k^{(i)} = U_k^{(i)} \Lambda_k^{(i)} U_k^{(i)H}$,
$U_k^{(i)}$ is a unitary matrix,
$\Lambda_k^{(i)}$ is a diagonal matrix arranged in a descending order,
$b_k^{(i)}[m]$ represents each of the plurality of data streams, and
$R_k^{(i)}$ represents a covariance matrix of $X_k^{(i)}$.

7. The terminal of claim 6, wherein:
   $N_k$ represents the number of 0 fed in the plurality of respective data streams,
   $N_k$ is determined by $N_k \triangleq 2M - \text{Rank}(R_k^{(i)})$, and
   2M represents the length of each of the plurality of data streams.

8. The terminal of claim 6, wherein:
   $X_k^{(i)}$ is determined to satisfy $$E\{X_k^{(i)} X_k^{(i)H}\} = \begin{bmatrix} R^{(i)}(f_k) & \tilde{R}^{(i)}(f_k) \\ \tilde{R}^{(i)}(f_k)^H & R^{(i)}(-f_k)^* \end{bmatrix} = R_k^{(i)},$$

$$k \in \left\{1, 2, \ldots, \frac{L}{2}\right\}.$$

\* \* \* \* \*